United States Patent
Qian et al.

(10) Patent No.: US 12,353,814 B2
(45) Date of Patent: Jul. 8, 2025

(54) SYSTEM-IN-PACKAGE TECHNOLOGY-BASED PROCESS DESIGN METHOD AND SYSTEM, MEDIUM, AND DEVICE

(71) Applicant: VAYO (SHANGHAI) TECHNOLOGY CO., LTD., Shanghai (CN)

(72) Inventors: Shengjie Qian, Shanghai (CN); Jihong Wu, Shanghai (CN); Jishuo Liu, Shanghai (CN); Fengshou Liu, Shanghai (CN)

(73) Assignee: Vayo (Shanghai) Technology Co., Ltd., Shanghai (CN)

( * ) Notice: Subject to any disclaimer, the term of this patent is extended or adjusted under 35 U.S.C. 154(b) by 841 days.

(21) Appl. No.: 17/611,546

(22) PCT Filed: Apr. 22, 2020

(86) PCT No.: PCT/CN2020/085999
§ 371 (c)(1),
(2) Date: Nov. 15, 2021

(87) PCT Pub. No.: WO2020/233319
PCT Pub. Date: Nov. 26, 2020

(65) Prior Publication Data
US 2022/0261525 A1    Aug. 18, 2022

(30) Foreign Application Priority Data
May 20, 2019   (CN) .......................... 201910419777.4

(51) Int. Cl.
G06F 30/30      (2020.01)
G06F 30/392     (2020.01)
(Continued)

(52) U.S. Cl.
CPC ........ *G06F 30/392* (2020.01); *G06F 2113/18* (2020.01); *G06F 2119/18* (2020.01)

(58) Field of Classification Search
CPC ............... G06F 30/392; G06F 2113/18; G06F 2119/18; G06F 2111/20; G06F 30/398; G06F 30/367; G06F 2113/20
See application file for complete search history.

(56) References Cited

U.S. PATENT DOCUMENTS 10,685,166 B1 * 6/2020 Kao ...................... G06F 30/398
2009/0030660 A1  1/2009 Celik et al.
(Continued)

FOREIGN PATENT DOCUMENTS

CN    102073775 A    5/2011
CN    104133955 A    11/2014
(Continued)

*Primary Examiner* — Jack Chiang
*Assistant Examiner* — Brandon Bowers
(74) *Attorney, Agent, or Firm* — IPRTOP LLC (57) ABSTRACT

A system-in-package technology-based process design method and system, a computer readable storage medium, and a device. The system-in-package technology-based process design method includes: acquiring design data of a layout and three-dimensional model data associated with the layout; associating and matching the design data with the three-dimensional model data according to the designed components' attribute information in the design data, and assembling the design data and the three-dimensional model data into an integrated package model; and performing assembly process analysis on the integrated package model to identify unreasonable design points used for design modifications and references, or directly exporting, from the integrated package model, a packaging process manufacturing program for fabrication.

13 Claims, 7 Drawing Sheets

(51) Int. Cl.
  *G06F 113/18*     (2020.01)
  *G06F 119/18*     (2020.01)

(56) References Cited

U.S. PATENT DOCUMENTS

2016/0381844 A1\* 12/2016 Knox .................... B33Y 10/00
                                                29/739
2020/0163220 A1\*  5/2020 Knox ................ G01R 31/2805

FOREIGN PATENT DOCUMENTS

| CN | 106777756 A | 5/2017 |
| CN | 109241681 A | 1/2019 |
| CN | 109446600 A | 3/2019 |
| CN | 110197019 A | 9/2019 |
| CN | 110222381 A | 9/2019 |

\* cited by examiner

SYSTEM-IN-PACKAGE TECHNOLOGY-BASED PROCESS DESIGN METHOD AND SYSTEM, MEDIUM, AND DEVICE

CROSS REFERENCE TO RELATED PATENT APPLICATION

The present application is the US national stage of PCT/CN2020/085999 filed on 2020 Apr. 22, which claims the priority of the Chinese patent application No. 201910419777.4 filed on 2019 May 20, which application is incorporated herein by reference.

FIELD OF TECHNOLOGY

The present disclosure belongs to the technical field of system packaging, and relates to a system-in-package technology-based design method, and in particular, to a system-in-package technology-based process design method and system, a computer readable storage medium, and a device.

BACKGROUND

In the last hundred years, with the rapid development of electronic technology, the size of electronic products has become increasingly smaller from micro-level to nano-level, and the performance of electronic products has become increasingly higher. Therefore, increasingly higher requirements are imposed on the electronics manufacturing industry. Packaging is the post-processing process of electronic products. Traditional packaging mainly includes three major functions. The first function is to protect core functions of the electronic product to prevent the electronic product from external influence or damage. The second function is to interconnect electronic functions with the outside to realize the functions of electronic devices. The third function is to realize the compatibility of physical dimension. Since the size of the bare chip is too small relative to the board-level connecting circuit, it is necessary to realize external connections by means of packaging. With the emergence of integrated circuits, especially the emergence of super-large-scale integrated circuits, the requirements for electronic devices have become increasingly higher. The system-in-package technology (SIP) is to integrate a plurality of bare chips and peripheral devices in a single package, by means of mounting technologies such as stacking, tiling, substrate embedding, and the like, achieving the miniaturization, high performance, multi-function, high reliability, and low costs of the electronic system.

In the electronics manufacturing industry, the current chip packaging and manufacturing by using the system-in-package technology mainly involve three major steps; design, simulation, and production. However, these three steps are currently less connected in the industry. The overall process from the beginning of data design to the final mass production is very complicated, tedious, and time-consuming, which virtually increase the production costs and reduces the competitiveness of the product. The existing operating methods have many drawbacks as follows. (1) There are too many manual operations in the whole process, which reduces the stability of fabrication. (2) Manual creation of a component model may take a lot of time for the operator, and the complex process may cause repeated modeling. (3) The existing methods have relatively high requirements on the capabilities of the operators. (4) Since no corresponding assembly and manufacturing and process virtual inspection is performed on the design data before fabrication, if there are problems in subsequent production, the entire production cycle will be greatly extended, thus greatly increasing the production costs and reducing the product competitiveness. With the acceleration of the upgrading of electronic products and the advancement of intelligent manufacturing & Industry 4.0, the concept of Internet+manufacturing and smart factory enjoys popular support, stimulating the entire electronics manufacturing industry to seek more efficient and reliable manufacturing methods and technologies.

Therefore, it has become an urgent technical problem for those skilled in the art to provide a system-in-package technology-based process design method and system, a computer readable storage medium, and a device, so as to overcome the shortcomings in the prior art, such as incapability of avoiding lots of repetitive work as well as the complex and error-prone manufacturing process.

SUMMARY

In view of the above-mentioned shortcomings of the prior art, an object of the present disclosure is to provide a system-in-package technology-based process design method and system, a computer readable storage medium, and a device to resolve the problems such as incapability of avoiding lots of repetitive work and the cumbersome and error-prone manufacturing process in the prior art.

To achieve the above object and other relevant objects, in an aspect, the present disclosure provides a system-in-package technology-based process design method. The system-in-package technology-based process design method includes: acquiring design data of a layout and three-dimensional model data associated with the layout; associating and matching the design data with the three-dimensional model data according to the designed components' attribute information in the design data, and assembling the design data and the three-dimensional model data into an integrated package model; and performing assembly process analysis on the integrated package model to identify unreasonable design points used for design modifications and references, where the assembly process analysis is to perform detection of design specification and system performance on the integrated package model; or directly exporting, from the integrated package model, a packaging process manufacturing program for fabrication.

In an embodiment of the present disclosure, the step of associating and matching the design data with the three-dimensional model data according to the designed components' attribute information in the design data includes: extracting the designed components' attribute information from the design data, where the components' attribute information includes manufacturer part number of a component, manufacturer part number of a bare chip, and/or package size information of the component, and the design data includes: the manufacturer part number, the package size information, bonding wire information, and/or three-dimensional coordinate information of the component, the bare chip, and/or a framework; retrieving, from an entity model library, three-dimensional models of a component and a bare chip having the same part number as that in the design data, and extracting relevant three-dimensional data and working parameters according to the retrieved three-dimensional models; and matching, as integrated data of same type by using the part number of the component and the bare chip as a connection relationship, the manufacturer part number of the component and the bare chip and package size information of a framework in the design data with the three-dimensional data and the working parameters of the component and the bare chip having the same part number in the entity model library.

In an embodiment of the present disclosure, the working parameters includes: mass, material, and/or specific heat capacity.

In an embodiment of the present disclosure, the step of performing the assembly process analysis on the integrated package model to identify unreasonable design points used for design modifications and references includes: detecting substrate information in the integrated package model; or performing wire bonding analysis on the integrated package model according to a wire bonding process manufacturing rule; or performing assembly analysis on each component in the integrated package model; or performing process analysis on the integrated package model according to a bare chip/surface mount devices (SMD) component manufacturing process rule.

In an embodiment of the present disclosure, detecting substrate information in the integrated package model includes detecting a device, a pad, a trace, a via, and/or copper of a substrate.

In an embodiment of the present disclosure, performing assembly analysis on each component in the integrated package model is to simulate the integrated package model.

In an embodiment of the present disclosure, the step of directly exporting, from the integrated package model, the package process manufacturing program for fabrication includes: generating a bonder program from the bonding wire information in the design data according to a predetermined bonder rule, where the bonder program is a program executed by a bonder in a manufacturing process; or generating a SMT pick-and-place machine program based on the information about the bare chip and a to-be-mounted component in the design data according to a predetermined SMT pick-and-place machine rule, where the SMT pick-and-place machine program is a program executed by a pick-and-place machine in the production process.

In another aspect, the present disclosure provides a system-in-package technology-based process design system. The system-in-package technology-based process design system includes: an acquisition module, configured to acquire design data of a layout and three-dimensional model data associated with the layout; a model generation module, configured to associate and match the design data with the three-dimensional model data according to component's attribute information in the design data, and assemble the design data and the three-dimensional model data into an integrated package model; and a production analysis module, configured to analyze assembly process of the integrated package model so as to identify the unreasonable design points used for design modifications and references, or directly export, from the integrated package model, a packaging process manufacturing program for fabrication.

In yet another aspect, the present disclosure provides a computer-readable storage medium storing a computer program. When the computer program is executed by a processor, the system-in-package technology-based process design method is performed.

In yet another aspect, the present disclosure provides a device, including a processor and a memory, where the memory is configured to store a computer program, and the processor is configured to execute the computer program stored in the memory, so that the device performs the system-in-package technology-based process design method.

As described above, the system-in-package technology-based process design method and system, the medium, and the device of the present disclosure have the following beneficial effects. Compared with the current traditional simulation production process, by means of the present disclosure, a lot of repetitive work can be avoided, and manual work can be replaced by automation, thereby saving 60%-80% of the time compared with the original method. In addition, the working difficulty is reduced, and the process from design to simulation and fabrication is simplified. The assembly & manufacturing and virtual process analysis of the design data exposes the problem before manufacturing, thereby reducing the manufacturing risk. In this way, the production costs are reduced, thereby greatly improving the competitiveness of electronic products.

REFERENCE NUMERALS

21. Acquisition module
22. Model generation module
23. Production analysis module
31. Processor
32. Memory
33. Transceiver
34. Communication interface
35. System bus
S11-S13 Steps of the system-in-package technology-based process design method

DETAILED DESCRIPTION

Embodiments of the present disclosure will be described below with specific examples, and other advantages and effects of the present disclosure may be easily understood by those skilled in the art from the disclosure in the specification. The present disclosure may also be carried out or applied in other different specific embodiments, and various modifications or changes may also be made to the details in the specification based on different ideas and applications without departing from the spirit of the present disclosure. It is to be noted that the following embodiments and features in the embodiments may be combined with each other if no conflicts will result.

It is to be noted that drawings provided in the following embodiments only schematically illustrate the basic idea of the present disclosure, so the drawings only show components related to the present disclosure, and are not drawn according to the numbers, shapes, and sizes of the components in actual implementation; the forms, numbers, and proportions of the components in actual implementation may represent an arbitrary variant; and the layout of the components may be more complex.

Technical principles of a system-in-package technology-based process design method and system, a computer readable storage medium, and a device of the present disclosure are as follows.

Acquire design data of a layout and three-dimensional model data associated with the layout. Associate and match the design data with the three-dimensional model data according to components' attribute information in the design data, and assemble the design data and the three-dimensional model data into an integrated package model. Analyze the assembly process of the integrated package model to identify the unreasonable design points used for design modifications and references. Alternatively, directly export a packaging process manufacturing program for fabrication from the integrated package model.

Embodiment I

This embodiment provides a system-in-package technology-based process design method. The system-in-package technology-based process design method includes:
  acquiring design data of a layout and three-dimensional model data associated with the layout;
  associating and matching the design data with the three-dimensional model data according to the designed components' attribute information in the design data, and assembling the design data and the three-dimensional model data into an integrated package model;
  analyzing the assembly process of the integrated package model to identify the unreasonable design points used for design modifications and references, where the assembly process analysis is to examine design specification and system performance on the integrated package model; or
  directly exporting, from the integrated package model, a packaging process manufacturing program for fabrication.

The system-in-package technology-based process design method provided in this embodiment is described in detail below with reference to FIG. 1A and FIG. 1B.

Figure 1A:
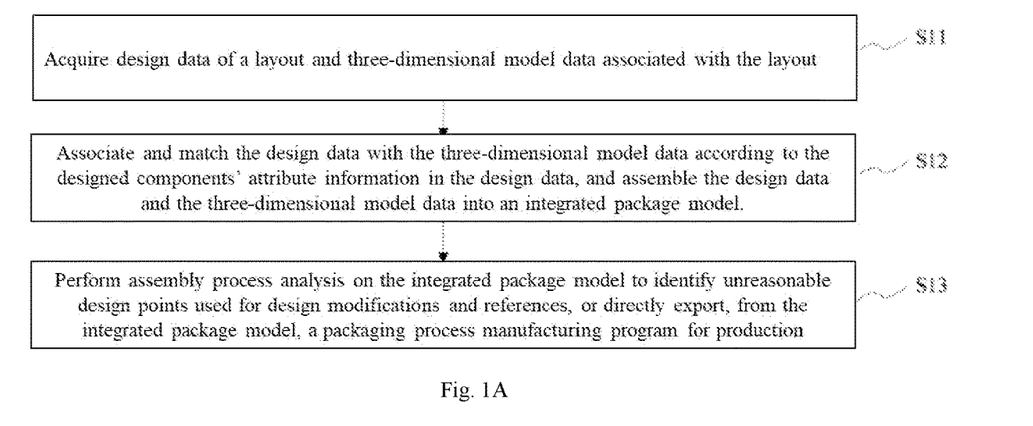
FIG. 1A shows a schematic diagram of a system-in-package technology-based process design method consistent with the present disclosure in an embodiment.

FIG. 1A shows a schematic diagram of a system-in-package technology-based process design method in an embodiment according to the present disclosure. As shown in FIG. 1A, the system-in-package technology-based process design method specifically includes the following steps.

S11: Acquire design data of a layout and three-dimensional model data associated with the layout.

Figure 4:
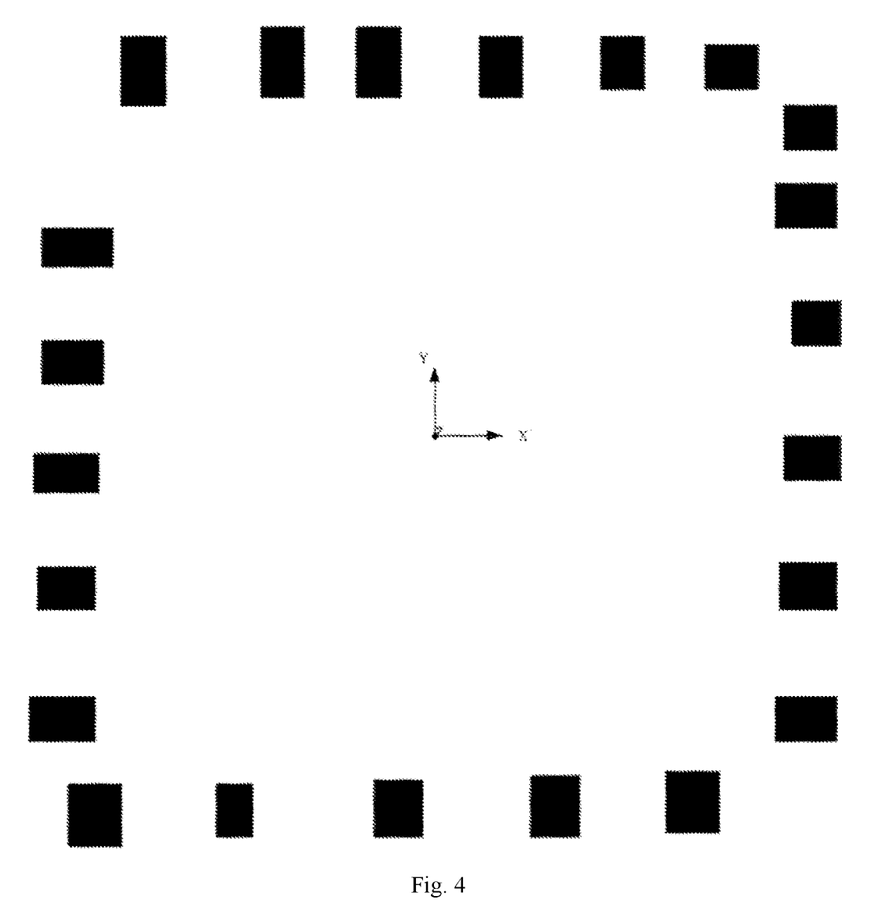
FIG. 4 shows a diagram of a bare chip model of a system-in-package technology-based process design method consistent with the present disclosure in an embodiment.

In this embodiment, the system-in-package technology refers to an SIP packaging form of semiconductor component. In terms of architecture, the SIP integrates, into one package, chips having a plurality of functions such as a processor and a memory, to achieve a basically complete function. In terms of the process, the SIP is to place and contain the bare chip (DIE, chiplet, seed core, or die) and components having specific functions in a framework suitable for the bare chip according to the layout design, forming an entirety of a complete device, that is, the integrated package model. In the integrated package model, wire bonding is required for electrical interconnection. For the bare chip, refer to FIG. 4, which shows a diagram of a bare chip model of a system-in-package technology-based process design method consistent with the present disclosure in an embodiment.

Specifically, the design data in the layout design software is read into the memory. In addition, if the material information is missing, a bill of material (BOM) also needs to be imported, and the bare chips and component references in the design data need to be in a one-to-one correspondence with the part number of entity. The design data includes BOM data, such as Cadence SIP design data"—.sip" file. The layout design software includes a Cadence SIP Design software. In the process of designing the layout, the used design elements such as components, bare chips, and framework all have corresponding BOM data and other design data.

In practical application, the three-dimensional model data of the bare chip, which is named after the manufacturer part number of the bare chip, is acquired from the bare chip library for storing the three-dimensional model data of the bare chip and a positional relationship of the pads. The three-dimensional model data of the framework, which is named after the package type and size, is acquired from the framework library for storing the three-dimensional model data of the chip framework. The three-dimensional model data of the component, which is named after the manufacturer part number, is acquired from the component library for storing the three-dimensional model data of the component and the actual working parameter data (mass, material, power consumption, and the like).

S12: Associate and match the design data with the three-dimensional model data according to the designed components' attribute information in the design data, and assemble the design data and the three-dimensional model data into an integrated package model. In practical application, according to the manufacturer part number of the component in the design data, the manufacturer part number of the bare chip, and the package size information, the design data is matched with the bare chip & framework library and the component 3D entity model library, thereby generating the integrated package model from the three-dimensional coordinate information of the design data and the three-dimensional model data.

In this embodiment, S12 includes the following steps.

S121: Extract components' attribute information from the design data. In this embodiment, the component's attribute information includes manufacturer part number information of a component, manufacturer part number information of a bare chip, package size information of a framework, and/or part name. The design data includes: the manufacturer part number information, the package size information, bonding wire information, and/or three-dimensional coordinate information of the component, the bare chip, and/or the framework.

In practical application, for example, in a substrate, the component A, the bare chip B, the resistor C, and the capacitor D are set in specific positions on the substrate according to to-be-achieved functions thereof and trace rules, and wiring design is performed. The substrate also needs to be set inside a framework E for integrated packaging. Therefore, if the part number of the component A is FU6008, then FU6008 needs to be extracted from the design data; if the part number of the bare chip B is QFP579Z, then QFP579Z needs to be extracted from the design data; if the part number of the resistor C is RX080522K, then RX080522K needs to be extracted from the design data; if part number of the capacitor D is CX060247U, CX060247U needs to be extracted from the design data. In addition, the package size information of the framework E further needs to be extracted. The package size information of the framework E includes dimensions (length, width, and height) of the outer edge, dimensions (length, width, and height) of the inner edge, chamfer size, thickness information, and the like.

S122: Retrieve, from an entity model library, three-dimensional models of a component and a bare chip having the same part number with that in the design data, and extract relevant three-dimensional data and working parameters according to the retrieved three-dimensional models.

Specifically, the entity model library pre-stores related devices for substrate design, including three-dimensional models of the component A, the bare chip B, the resistor C, the capacitor D, and the framework E. The three-dimensional model includes information about the device performance such as three-dimensional size information and the working parameters of the device. The working parameters include: mass, material, and/or specific heat capacity.

S123: Match, as integrated data of same type by using the part number of the component and the bare chip as a connection relationship, the manufacturer part number information of the component and the bare chip and package size information of a framework in the design data with the three-dimensional data and the working parameters of the component and the bare chip in the entity model library, where the component and the bare chip in the entity model library has the same part number with that in the design data.

In practical application, the two-dimensional coordinate information of FU6008, QFP579Z, RX080522K, CX060247U, and the framework E on the substrate are retrieved from the design data. Thus, coordinate information of the component A, the bare chip B, the resistor C, the capacitor D, and the framework E on the substrate is extracted. The component of FU6008, QFP579Z, RX080522K, CX060247U, and framework E are also retrieved from the entity model library. Thus, complete three-dimensional model data of the component A, the bare chip B, the resistor C, the capacitor D, and the framework E are extracted, and the extracted three-dimensional model data includes information about the component performance such as three-dimensional size information and working parameters of the component. A relationship is established between the substrate and the entity model library by using the two-dimensional coordinate information of the same part number of FU6008, QFP579Z, RX080522K, and CX060247U and the framework E on the substrate. For example, the three-dimensional model of the component used in the substrate design is extracted from the entity model library, and the three-dimensional model of the component having the part number is imported into the corresponding substrate position according to the position of the component designed in the substrate. The three-dimensional model of the framework E is also imported into the substrate for packaging and assembling, thereby generating integrated data of each component. The integrated data includes parameters and positions on the substrate of components used by the substrate, and carried three-dimensional data information and working parameter information when the entity model library is imported into the three-dimensional model.

S13: Perform assembly process analysis on the integrated package model to identify unreasonable design points used for design modifications and references, or directly export, from the integrated package model, a packaging process manufacturing program for fabrication.

In this embodiment, after the assembly process analysis is performed on the integrated package model, the unreasonable design points are reported to the designer for modification, and the integrated package model is regenerated after the modification is completed. When there are unreasonable points in the design, the regenerated integrated package model is used to export the packaging process manufacturing program. When the assembly process analysis is not performed or there is no unreasonable point after the analysis, the integrated package model is directly used to export the package process manufacturing program. It should be noted that the integrated package model is not only a three-dimensional model, but also carries the working performance parameters of all involved components, such as the integrated data of the components of same type described in S123.

Figure 1B:
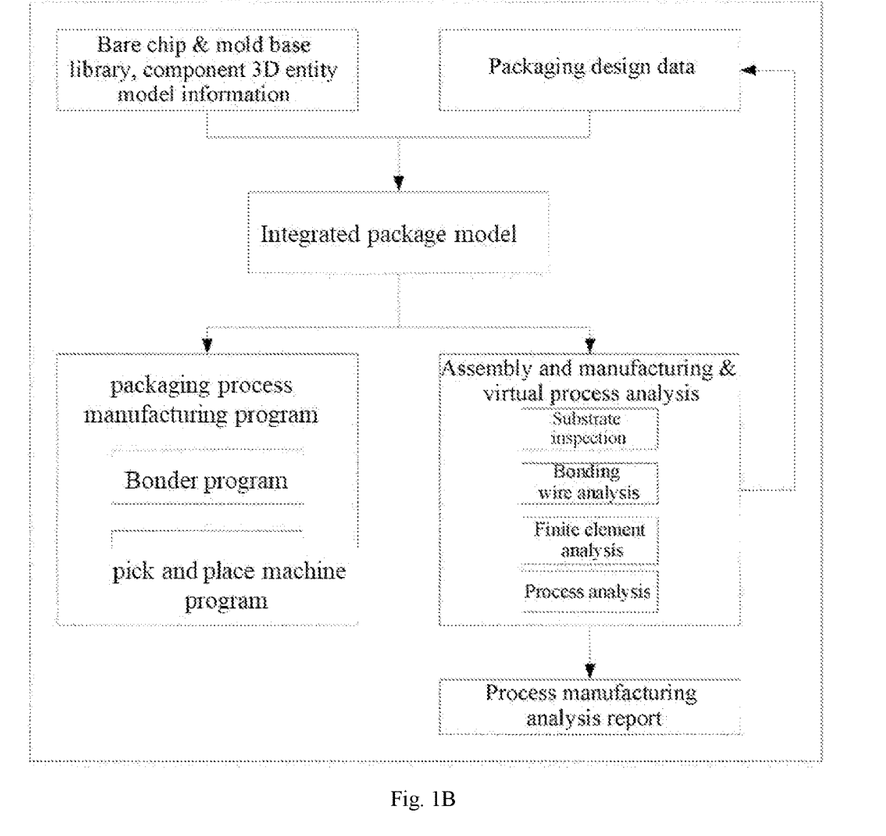
FIG. 1B shows a flow diagram of a system-in-package technology-based process design method consistent with the present disclosure in an embodiment.

Specifically, FIG. 1B shows a flow diagram of a system-in-package technology-based process design method consistent with the present disclosure in an embodiment.

In this embodiment, S13 includes:
detecting the information of substrate in the integrated package model. The basic design process involves the arrangement of components, trace, pad, and setting vias. Thereinto, a safety distance and a wiring distance between the component and the component, and a wiring distance between the pad, the via, and the component needs to meet the predetermined distance range to ensure the rationality of the design and the performance of the substrate. As a result, the detecting substrate information in the integrated package model includes detection of a component, pad, trace, via, and/or copper of the substrate.

Figure 5:
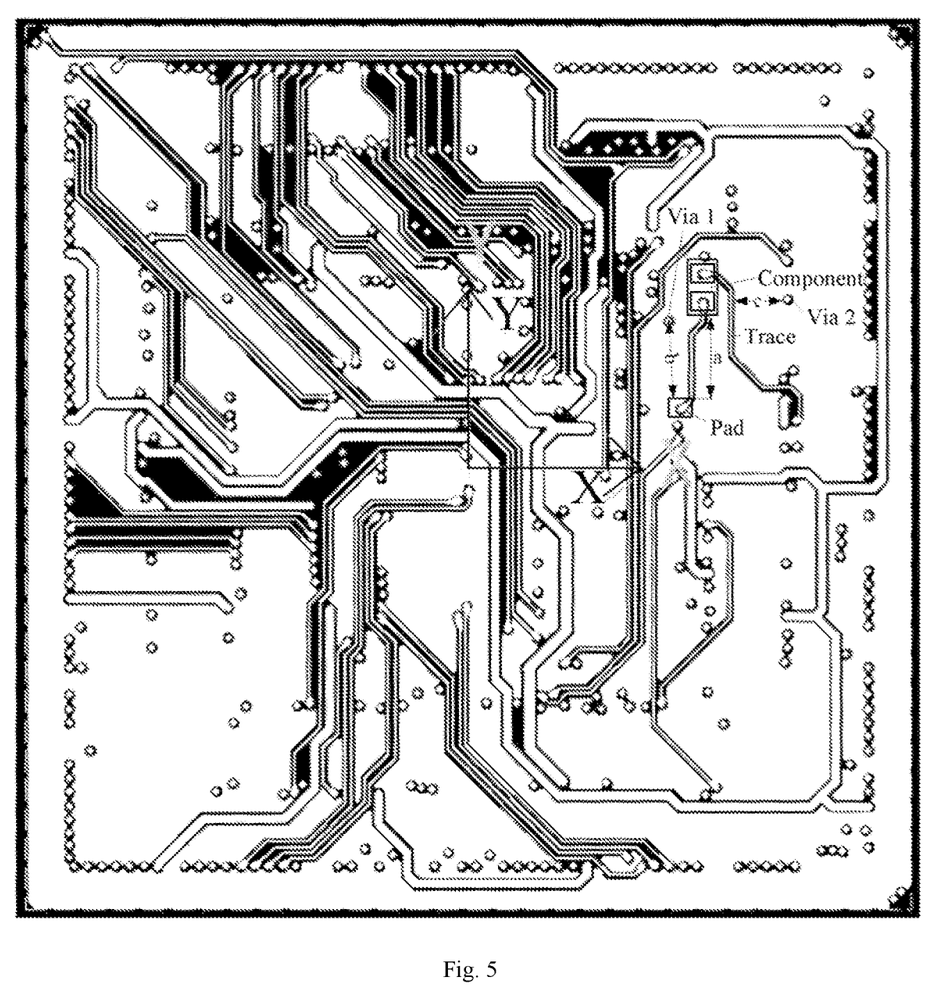
FIG. 5 shows a diagram of substrate analysis of a system-in-package technology-based process design method consistent with the present disclosure in an embodiment.

FIG. 5 shows a diagram of substrate analysis of a system-in-package technology-based process design method consistent with the present disclosure in an embodiment. The substrate detection in FIG. 5 includes: detecting whether the distance "a" between the pad and the component meets the safety design specification, which is a safety threshold. If the distance "a" is less than the safety threshold, the design problem is reported as an error. Similarly, according to the coordinate information of the components, vias, pads, and traces on the substrate, a distance "b" between the via 1 and the pad, a distance between the trace and the via 2, and a distance between the vias in the substrate may be calculated, and it may be detected whether the hole size of the via meets the processing requirements.

Figure 6:
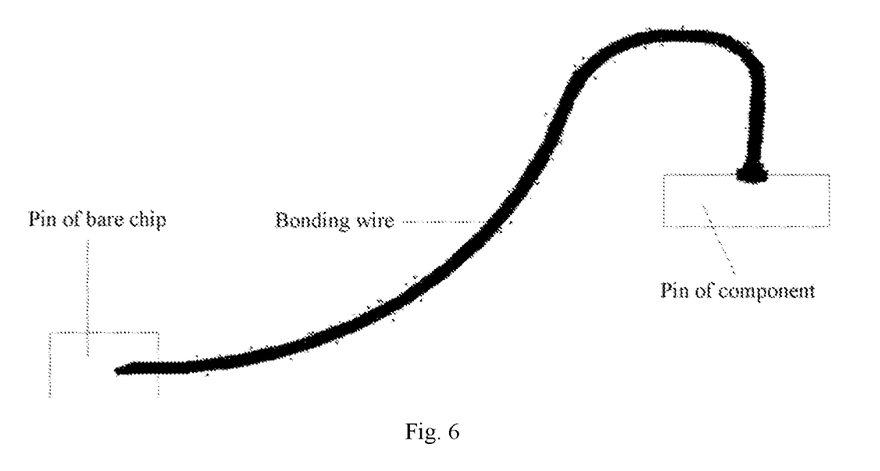
FIG. 6 shows a diagram of a bonding wire model of a system-in-package technology-based process design method consistent with the present disclosure in an embodiment.

Wire bonding analysis is performed on the integrated package model according to a wire bonding process manufacturing rule. Specifically, the system-in-package technology is a wire bonding packaging technology. The bonding technology includes thermocompression bonding and thermosonic bonding. Therefore, FIG. 6 shows a diagram of a wire bonding model of a system-in-package technology-based process design method consistent with the present disclosure in an embodiment. The wire bonding is used as an electrical connection between a pin of the mounted components and a pin of the bare chip. The wire bonding analysis is to perform rule checking according to wire bonding process manufacturing rules such as whether a length of the bonding wire is appropriate, whether a diameter of the bonding wire is appropriate, whether a direction of the bonding wire is reasonable, whether the fixing of the bonding wire is firm, and whether the distance between the bonding wire and the bonding wire conforms to safety requirements.

Figure 7:
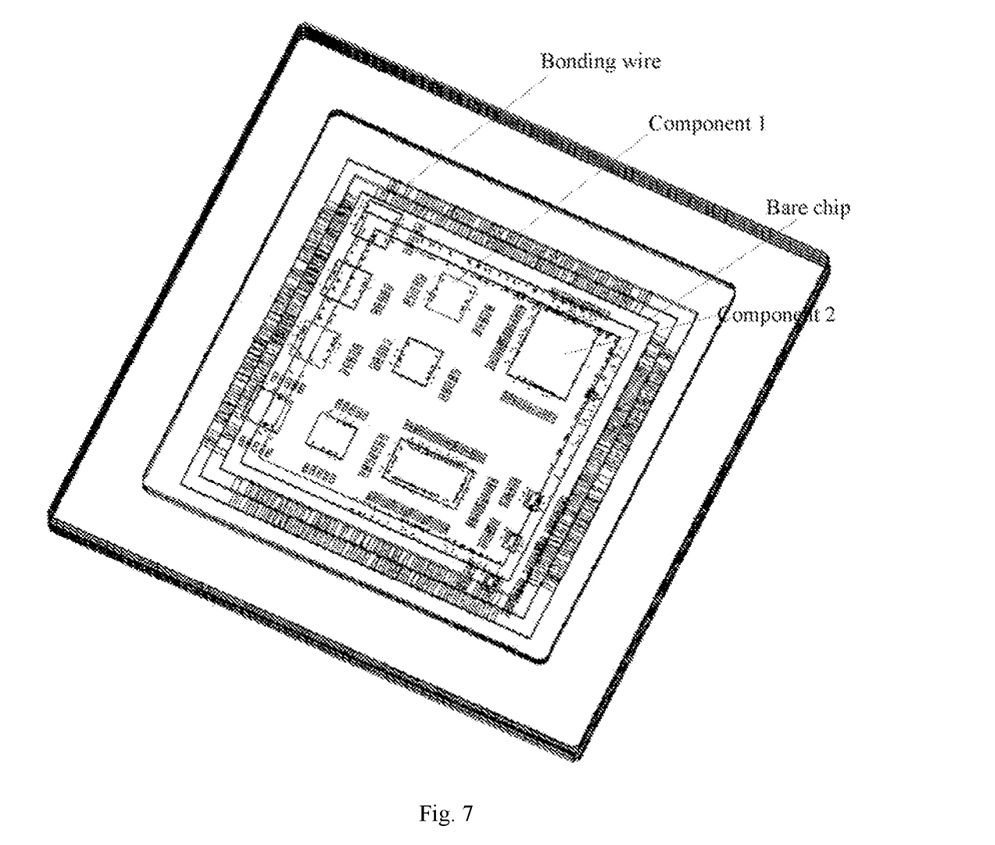
FIG. 7 shows a diagram of a chip assembly model of a system-in-package technology-based process design method consistent with the present disclosure in an embodiment.
Figure 8:
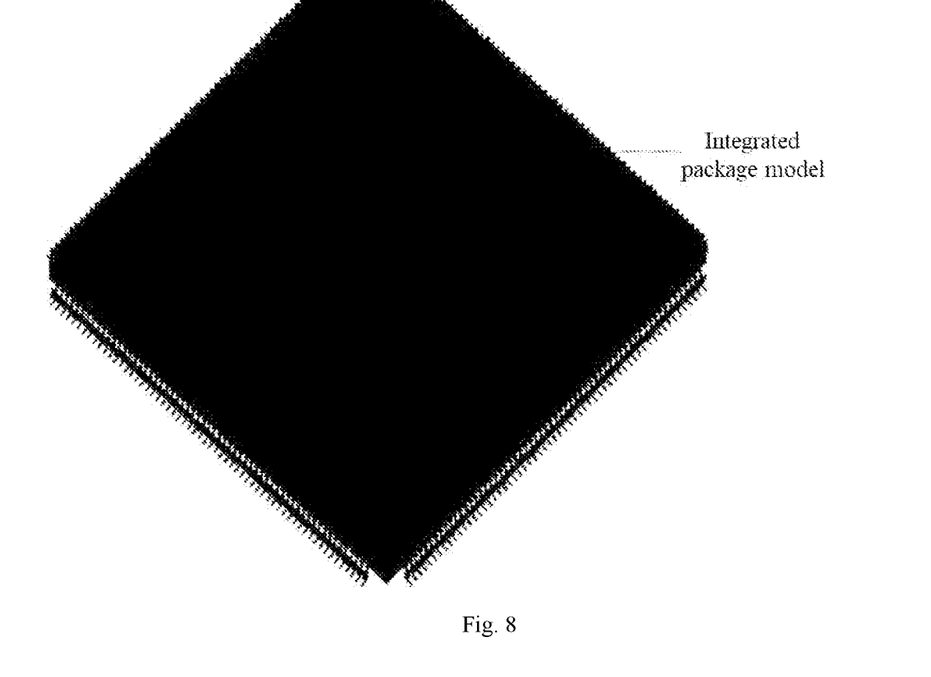
FIG. 8 shows a diagram of an integrated package model of a system-in-package technology-based process design method consistent with the present disclosure in an embodiment.

Assembly analysis is performed on each component in the integrated package model. In practical application, the integrated package model is an entirety composed of the component, the substrate, the bare chip, and the framework. FIG. 7 and FIG. 8 respectively show a diagram of a chip assembly model of a system-in-package technology-based process design method consistent with the present disclosure in an embodiment and a diagram of an integrated package model of a system-in-package technology-based process design method consistent with the present disclosure in an embodiment. In the integrated system, whether a distance between a component 1 and a component 2, a distance between the component and the bare chip, a distance between the component and the framework, and a distance between the bare chip and the framework is reasonable; if the component 2 is a high-frequency device, whether the designed distance can effectively avoid electromagnetic interference; if the component 2 is a heating device, whether the entire system design and assembly can effectively dissipate heat; if the component 2 is a sensitive device, whether the component at the location can be effectively kept away from the interference of other devices; whether a structure with the outermost framework in FIG. 8 being packaged makes full use of the space and conforms to the layout rules on the basis of beauty, and whether there is interference between the position and corners of the components, in view of the above problem, the assembly analysis of the components in the integrated package model refers to the simulation of the integrated package model. The simulation method includes finite element analysis, by which the simulation and tests of electromagnetism, heat, structure and the like are performed. The implementation of the finite element analysis includes: UG, ANSYS, and/or Flotherm.

Process analysis is performed on the integrated package model according to a bare chip/SMD component manufacturing process rule. In the wire bonding packaging process, design problems may be caused due to various process flows. These problems are, for example, whether the thinning of the wafer is appropriate, whether the cutting of the wafer causes edge damage, whether soft solder is completely fixed when the chip is bonded, whether the solder is splashed to other positions, whether an amount and positions of polymer adhesive are appropriate, whether the bare die is shifted, whether there is cold solder joint for the components, whether the components are correctly placed according to the model, and whether the components are damaged. The process analysis is to check the results one by one and feedback the output report to the designer.

A die bonder program is generated from the bonding wire information in the design data according to a predetermined die bonder rule, which is to generate an execution instruction for each bonding wire according to their designed position on the substrate and the bonding wire's direction, and start & end points of the integrated package model. The execution instruction can be used to fix each bonding wire between the components according to the designed coordinates and the start & end points. The execution instructions of all bonding wires are combined to generate the bonder program, which is the program executed by the die bonder in the manufacturing process.

Alternatively, a program of pick-and-place machine is generated based on the information of the bare chip and to-be-mounted component in the design data according to a predetermined pick-and-place machine rule, which is to generate an execution instruction of each component, of which the model and the position correspond to each other, according to a BOM table, a coordinate file, and a Gerber substrate image of the design file. According to the execution instruction, each component can be welded and fixed to the designed coordinate position of the substrate. The execution instructions of all components are combined to generate the pick-and-place machine program, which is a program executed by the pick-and-place machine in the manufacturing process.

This embodiment provides a computer-readable storage medium storing a computer program. When the computer program is executed by a processor, the system-in-package technology-based process design method is performed.

Those of ordinary skill in the art may understand that all or a part of the steps for implementing the above method embodiments may be completed by hardware related to the computer program. The above computer program may be stored in a computer-readable storage medium. When the computer program is executed, the steps including the foregoing method embodiments are performed. The above computer-readable storage medium includes: various computer storage media such as a ROM, a RAM, a magnetic disk, an optical disk, or the like, able to store program code.

By means of the system-in-package technology-based process design method in this embodiment, a lot of repetitive work can be avoided, and manual work can be replaced by automation, thereby saving 60%-80% of the time compared with the original method. In addition, the working difficulty is reduced, and the process from design to simulation and fabrication is simplified, greatly improving the competitiveness of electronic products.

Embodiment II

This embodiment provides a system-in-package technology-based process design system. The system-in-package technology-based process design system includes:
  an acquisition module, configured to acquire design data of a layout and three-dimensional model data associated with the layout;
  a model generation module, configured to associate and match the design data with the three-dimensional model data according to designed components' attribute information in the design data, and assemble the design data and the three-dimensional model data into an integrated package model; and
  a production analysis module, configured to perform assembly process analysis on the integrated package model to identify unreasonable design points used for design modifications and references, or directly export, from the integrated package model, a package process manufacturing program for fabrication.

The system-in-package technology-based process design system provided in this embodiment is described in detail below with reference to the drawings. It should be noted that, it should be understood that the following division of the various modules of the design system is only a division of logical functions, and can be fully or partially integrated into a physical entity in actual implementation, or physically separated. In addition, these modules may all be implemented in the form of software being called by processing elements, or all may be implemented in the form of hardware. Alternatively, some modules may be implemented in the form of software being called by processing elements, and some other modules may be implemented in the form of hardware. For example, a module "x" may be a separate processing element, or may be integrated in a chip of the following design system for implementation. In addition, the module "x" may also be stored in the memory of the following design system in the form of program code, which is to be called by a processing element of the following design system to execute the function of the following module "x". The implementation of other modules is similar to that of the module. All or part of these modules can be integrated together or implemented independently. The processing element described herein may be an integrated circuit having a signal processing capability. During implementation, each step of the foregoing method or each of the following modules may be completed by using an integrated logic circuit of hardware in the processor element or an instruction in the form of software.

The following modules may be one or more integrated circuits configured to implement the above methods, for example: one or more specific integrated circuits (scanning application Specific Integrated Circuit, ASIC for short), one or more microprocessors (Digital Signal Processor, DSP for short), one or more field programmable gate array (FPGA for short), and the like. When one of the following modules is implemented by a processing element calling program code, the processing element may be a general-purpose processor, such as a central processing unit (CPU for short) or other processors that can call program code. These modules can be integrated together and implemented in the form of system-on-a-chip (SOC for short).

Figure 2:
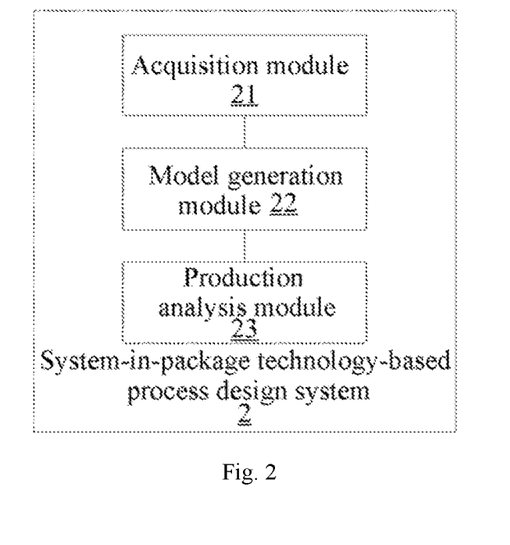
FIG. 2 shows a schematic structure diagram of a system-in-package technology-based process design system consistent with the present disclosure in an embodiment.

FIG. 2 shows a schematic structure diagram of a system-in-package technology-based process design system consistent with the present disclosure in an embodiment. As shown in FIG. 2, a system-in-package technology-based process design system 2 includes: an acquisition module 21, a model generation module 22, and a production analysis module 23.

The acquisition module 21 is configured to acquire design data of a layout and three-dimensional model data associated with the layout.

The model generation module 22 is configured to associate and match the design data with the three-dimensional model data according to designed components' attribute information in the design data, and assemble the design data and the three-dimensional model data into an integrated package model.

In this embodiment, the model generation module 22 is configured to extract the designed components' attribute information from the design data. Thereinto, the designed components' attribute information includes manufacturer part number information of a component, manufacturer part number information of a bare chip, and/or package size information of the component, and the design data includes: the manufacturer part number information, the package size information, wire bonding information, and/or three-dimensional coordinate information of a component, a bare chip, and/or a framework; from an entity model library, three-dimensional models of a component and a bare chip having the same part number with that in the design data are retrieved, and relevant three-dimensional data and working parameters are extracted according to the retrieved three-dimensional models. Thereinto, the working parameters includes: mass, material, and/or specific heat capacity. Matching, as integrated data of same type by using the part number of the component and the bare chip as a connection relationship, the manufacturer part number of the component and the bare chip and package size information of a framework in the design data, with the three-dimensional data and the working parameters of the component and the bare chip in the entity model library, where the component and the bare chip has the same part number with that in in the design data.

The production analysis module 23 is configured to perform assembly process analysis on the integrated package model to identify unreasonable design points used for design modifications and references, or directly export, from the integrated package model, a packaging process manufacturing program for fabrication.

In practical application, the production analysis module 23 is configured to detect substrate information in the integrated package model. The detecting substrate information in the integrated package model includes detecting a component, a pad, a trace, a via, and/or a copper of a substrate; or performing wire bonding analysis on the integrated package model according to a wire bonding process manufacturing rule; or performing assembly analysis on each component in the integrated package model, where the performing assembly analysis on each component in the integrated package model means simulating the integrated package model; or performing process analysis on the integrated package model according to a bare chip/SMD component manufacturing process rule.

In this embodiment, the production analysis module 23 is further configured to generate a bonder program from the bonding wire information in the design data according to a predetermined bonder rule, where the bonder program is a program executed by a bonder in a manufacturing process; or generating a pick-and-place machine program from information about the bare chip and a to-be-mounted component in the design data according to a predetermined pick-and-place machine rule, where the pick-and-place machine program is a program executed by a SMT machine in the production process.

By means of the system-in-package technology-based process design system in this embodiment, a lot of repetitive work can be avoided, and manual work can be replaced by automation, thereby saving 60%-80% of the time compared with the original method. In addition, the working difficulty is reduced, and the process from design to simulation and fabrication is simplified, greatly improving the competitiveness of electronic products.

Embodiment III

This embodiment provides a device, including a processor and a memory, where the memory is configured to store a computer program, and the processor is configured to execute the computer program stored in the memory, so that the device performs the system-in-package technology-based process design method.

Figure 3:
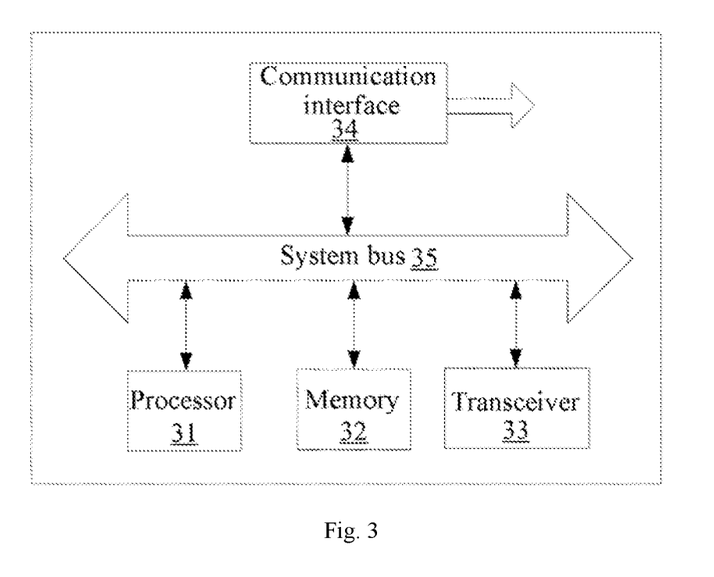
FIG. 3 shows a diagram of device connection of a system-in-package technology-based process design method consistent with the present disclosure in an embodiment.

FIG. 3 shows a diagram of device connection of a system-in-package technology-based process design method consistent with the present disclosure in an embodiment. The device includes: a processor 31, a memory 32, a transceiver 33, a communication interface 34, and/or a system bus 35. The memory 32 and the communication interface 34 are connected to the processor 31 and the transceiver 33 by using the system bus 35 to complete mutual communication. The memory 32 is used to store a computer program. The communication interface 34 is used for communication with other devices. The processor 31 and the transceiver 33 are used to run the computer program to enable the device to perform the steps of the system-in-package technology-based process design method.

The above system bus 35 may be a peripheral component interconnect (PCI for short) bus or an extended industry standard architecture (EISA for short) bus, or the like. The system bus 35 may be divided into an address bus, a data bus, a control bus, and the like. The communication interface is used for implementing communication between a database access device and other devices (such as a client, a read-write library, and a read-only library). The memory may include a random access memory (RAM for short), and may also include a non-volatile memory, for example, at least one disk memory.

The above processor 31 may be a general-purpose processor, including a central processing unit (CPU for short), a network processor (NP for short), and the like. The processor may alternatively be a digital signal processing (DSP), an application specific integrated circuit (scanning application specific integrated circuit, ASIC for short), a field programmable gate array (FPGA for short), or other programmable logic devices, a discrete gate or a transistor logic device, or a discrete hardware assembly.

The protection scope of the system-in-package technology-based process design method of the present disclosure is not limited to the sequence of performing the steps listed in this embodiment. The solutions implemented by increasing or decreasing steps and replacing steps in the prior art based on the principles of the present disclosure all fall within the protection scope of the present disclosure.

The present disclosure further provides a system-in-package technology-based process design system. The system-in-package technology-based process design system can implement the system-in-package technology-based process design method of the present disclosure. However, the device for implementing the system-in-package technology-based process design method of the present disclosure includes, but is not limited to, the structure of the system-in-package technology-based process design system listed in this embodiment. All structural modifications and replacements in the prior art made according to the principles of the present disclosure all fall within the protection scope of the present disclosure.

Based on the above, according to the system-in-package technology-based process design method and system, the medium, and the device of the present disclosure, compared with the current traditional simulation production process, by means of the present disclosure, a lot of repetitive work can be avoided, and manual work can be replaced by automation, thereby saving 60%-80% of the time compared with the original method. In addition, the working difficulty is reduced, and the process from design to simulation and fabrication is simplified. The assembly and manufacturing & virtual process analysis of the design data exposes the problem before fabrication, thereby reducing the manufacturing risk. In this way, the production costs are reduced, thereby greatly improving the competitiveness of electronic products. The present disclosure effectively overcomes various disadvantages in the prior art, and has high industrial utilization value.

The foregoing embodiments merely exemplify the principles and effects of the present disclosure, but are not intended to limit the present disclosure. Any person skilled in the art may modify or change the foregoing embodiments without departing from the spirit and scope of the present disclosure. Therefore, all equivalent modifications or changes made by a person skilled in the art without departing from the spirit and technical ideas disclosed in the present disclosure should still be covered by the claims of the present disclosure.

What is claimed is:

1. A system-in-package technology-based process design method, comprising:
    acquiring design data of a layout of designed components comprising to-be-packaged semiconductor components, and traces, pads, vias, and copper on a substrate, and three-dimensional model data associated with the layout; wherein the three-dimensional model data comprises three-dimensional models of the designed components;
    associating and matching the design data with the three-dimensional model data according to the designed components' attribute information in the design data to obtain positions of the designed components on the substrate, and assembling the three-dimensional models of the designed components into an integrated package model according to the positions;
    performing assembly process analysis on the integrated package model to identify unreasonable design points used for design modifications and references, wherein the assembly process analysis is to perform detection of design specification and system performance on the integrated package model;
    in response to there being unreasonable points after the analysis, reporting the unreasonable points to a designer for modification, and regenerating the integrated package model for the assembly process analysis after the modification; and
    in response to there being no unreasonable point after the analysis, directly exporting, from the integrated package model, a packaging process manufacturing program for fabrication.

2. The system-in-package technology-based process design method according to claim 1, wherein the associating and matching the design data with the three-dimensional model data according to the designed components' attribute information in the design data comprises:
    extracting the designed components' attribute information from the design data, wherein the designed component's attribute information comprises manufacturer part number information of a component, manufacturer part number information of a bare chip, and/or package size information of the component, and the design data comprises: the manufacturer part number information, the package size information, bonding wire information, and/or three-dimensional coordinate information of the component, the bare chip, and/or a framework;
    retrieving, from an entity model library, three-dimensional models of a component and a bare chip having the same part number with that in the design data, and extracting relevant three-dimensional data and working parameters according to the retrieved three-dimensional models; and
    matching, as integrated data of same type by using the part number information of the component and the bare chip as a connection relationship, the manufacturer part number information of the component and the bare chip and package size information of a framework in the design data with the three-dimensional data and the working parameters of the component and the bare chip in the entity model library, where the component and the bare chip in the entity model library has the same part number with that in the design data.

3. The system-in-package technology-based process design method according to claim 2, wherein
    the working parameters comprise mass, material, and/or specific heat capacity.

4. The system-in-package technology-based process design method according to claim 1, wherein the step of performing the assembly process analysis on the integrated package model to identify unreasonable design points used for design modifications and references comprises:
- detecting substrate information in the integrated package model.

5. The system-in-package technology-based process design method according to claim 4, wherein the detecting of the substrate information in the integrated package model comprises:
- detecting whether first distances between the pads and the to-be-packaged semiconductor components are larger than a safety threshold;
- calculating second distances between the vias and the pads, third distances between traces and the vias, and fourth distances between each two of the vias, based on coordinate information of the to-be-packaged semiconductor components, vias, pads, and traces, to see if they conform to requirements; and
- detecting whether sizes of the vias meets processing requirements.

6. The system-in-package technology-based process design method according to claim 1, wherein the directly exporting, from the integrated package model, the packaging process manufacturing program for fabrication comprises:
- generating a bonder program from the bonding wire information in the design data according to a predetermined bonder rule, wherein the bonder program is a program executed by a bonder in a fabrication process.

7. A non-transitory computer-readable storage medium storing a computer program, wherein the computer program, when executed by a processor, implements any of the system-in-package technology-based process design method stated in claim 1.

8. A device, comprising a processor and a memory, wherein
- the memory is configured to store a computer program, and the processor is configured to execute the computer program stored in the memory so that the device performs any of the system-in-package technology-based process design method stated in claim 1.

9. The system-in-package technology-based process design method according to claim 1, wherein the step of performing the assembly process analysis on the integrated package model to identify unreasonable design points used for design modifications and references comprises:
- performing bonding wire analysis on the integrated package model according to a wire bonding process manufacturing rule.

10. The system-in-package technology-based process design method according to claim 1, wherein the step of performing the assembly process analysis on the integrated package model to identify unreasonable design points used for design modifications and references comprises:
- performing assembly analysis on each component in the integrated package model by performing simulation on the integrated package model.

11. The system-in-package technology-based process design method according to claim 1, wherein the step of performing the assembly process analysis on the integrated package model to identify unreasonable design points used for design modifications and references comprises:
- performing process analysis on the integrated package model according to a bare chip/surface-mount-devices (SMD) component manufacturing process rule.

12. The system-in-package technology-based process design method according to claim 1, wherein the directly exporting, from the integrated package model, the packaging process manufacturing program for fabrication comprises:
- generating a surface-mount-technology (SMT) pick-and-place machine program from information about the bare chip and a to-be-mounted component in the design data according to a predetermined SMT pick-and-place machine rule, wherein the SMT machine program is a program executed by a SMT pick-and-place machine in the fabrication process.

13. A system-in-package technology-based process design system, comprising:
- an acquisition module, configured to acquire design data of a layout of designed components comprising to-be-packaged semiconductor components, and traces, pads, vias, and copper on a substrate, and three-dimensional model data associated with the layout; wherein the three-dimensional model data comprises three-dimensional models of the designed components;
- a model generation module, configured to associate and match the design data with the three-dimensional model data according to the designed components' attribute information in the design data to obtain positions of the designed components on the substrate, and assemble the three-dimensional models of the designed components into an integrated package model according to the positions; and
- a production analysis module, configured to:
  - perform assembly process analysis on the integrated package model to identify unreasonable design points used for design modifications and references,
  - in response to there being unreasonable points after the analysis, report the unreasonable points to a designer for modification, and regenerate the integrated package model for the assembly process analysis after the modification; and
  - in response to there being no unreasonable point after the analysis, directly export, from the integrated package model, a packaging process manufacturing program for fabrication.

* * * * *